United States Patent [19]
Joerg et al.

[11] Patent Number: 5,682,959
[45] Date of Patent: Nov. 4, 1997

[54] SERVO-ASSISTED RACK-AND-PINION STEERING SYSTEM

[75] Inventors: Wolfgang Joerg, Stuttgart; Jaromir Bordovsky, Berglen; Aydogan Cakmaz, Stuttgart; Hubert Heck, Duesseldorf; Arno Roehringer, Ditzingen; Claus Gall, Fellbach; Reinhold Abt, Neuhausen; Rainer Strauss, Kaarst; Karl-Hans Koehler, Wernau, all of Germany

[73] Assignee: Mercedes-Benz AG, Germany

[21] Appl. No.: 495,994

[22] Filed: Jun. 28, 1995

[30] Foreign Application Priority Data

Jun. 28, 1994 [DE] Germany ............... 44 22 551.2

[51] Int. Cl.$^6$ .................................................. B62D 5/09
[52] U.S. Cl. .................... 180/428; 180/427; 180/441; 74/422
[58] Field of Search ............... 180/417, 426, 180/427, 428, 431, 434, 441, 442; 74/388 PS, 422, 494; 91/368, 375 A, 401; 92/136

[56] References Cited

U.S. PATENT DOCUMENTS

| | | | |
|---|---|---|---|
| 4,279,323 | 7/1981 | Ando et al. | 180/428 |
| 4,615,408 | 10/1986 | Cordiano | 180/428 |
| 4,627,510 | 12/1986 | Camus | 180/427 X |
| 4,699,231 | 10/1987 | Lang et al. | 180/428 |
| 5,086,864 | 2/1992 | Elser | 180/427 |
| 5,147,007 | 9/1992 | Kahrs et al. | 180/428 X |

FOREIGN PATENT DOCUMENTS

| | | |
|---|---|---|
| 0192641 | 9/1986 | European Pat. Off. |
| 4026983A1 | 2/1992 | Germany |
| 4126020A1 | 2/1993 | Germany |
| WO92/03325 | 3/1992 | WIPO |

*Primary Examiner*—Victor E. Johnson
*Attorney, Agent, or Firm*—Evenson, McKeown, Edwards & Lenahan P.L.L.C.

[57] ABSTRACT

The invention relates to a servo-assisted rack-and-pinion steering system having a helical-toothed rack and an axially movable pinion which interacts therewith and the axial movement of which controls the servomotor. The pinion is mounted on an input shaft in such a manner as to be incapable of rotation with respect to the shaft but axially movable thereon, in order to suppress the transmission of axial forces between the input shaft and the pinion.

16 Claims, 1 Drawing Sheet

5,682,959

SERVO-ASSISTED RACK-AND-PINION STEERING SYSTEM

BACKGROUND AND SUMMARY OF THE INVENTION

The invention relates to a servo-assisted rack-and-pinion steering system having a helical-toothed rack interacting with an axially movable pinion, the axial pinion movement actuating the servo-motor or the control elements of the pinion.

A rack-and-pinion steering system of this kind is known from European Patent Document EP 01 92 641 B1 and from German Patent Document DE 41 26 020 A1. In this known rack-and-pinion steering system the pinion, together with the pinion shaft, is arranged for axial movement in the gear casing of the rack-and-pinion steering system, so that the parts of the steering column or the like which adjoin the pinion shaft must also have corresponding movability. Apart from the fact that this can entail design difficulties, it also gives rise to the risk that movements of the steering column or the like may unintentionally move the pinion axially and actuate the servomotor.

From German Patent Document DE 40 26 983 A1 a rack-and-pinion steering system is known in which the pinion is drivingly connected with torsional elasticity to a coaxial shaft part, and a sleeve, which is arranged in the connection region between the pinion and the shaft part and is concentric to the shaft axis, is moved axially when the pinion and the shaft part are turned relative to one another. A design of this kind takes up a relatively great amount of space in the axial direction of the pinion.

It is therefore the object of the present invention to provide a novel rack-and-pinion steering system of the above mentioned kind which takes up little space and is of a comparatively simple design, while reliably ensuring that the servomotor is actuated only analogously to the steering forces which are transmitted between the pinion and the rack.

This object has been achieved according to the present invention by providing a pinion in the form of a sleeve-like part which is mounted on a shaft, and which is rotatably mounted with radial immovability, in such a manner as to be axially movable on the shaft but incapable of rotation relative to the shaft.

The invention is based on the general principle of axially uncoupling the pinion shaft and the pinion from one another, so that no axial forces can be transmitted between the pinion and the pinion shaft and that relative axial movements between these parts have no effect on the control of the servomotor.

According to a preferred embodiment of the invention provision is made for the pinion to be mounted on the shaft by means of a linear-ball bearing in order to permit relative axial movements between the shaft and the pinion with negligible friction.

In addition, it is usually expedient also to mount the shaft rotatably with axial immovability or at most only to allow slight axial movements of the shaft compared with the pinion.

These and other objects, features and advantages of the present invention will become more readily apparent from the following detailed description when taken in conjunction with the accompanying drawing.

DETAILED DESCRIPTION OF THE DRAWING

Figure 1:
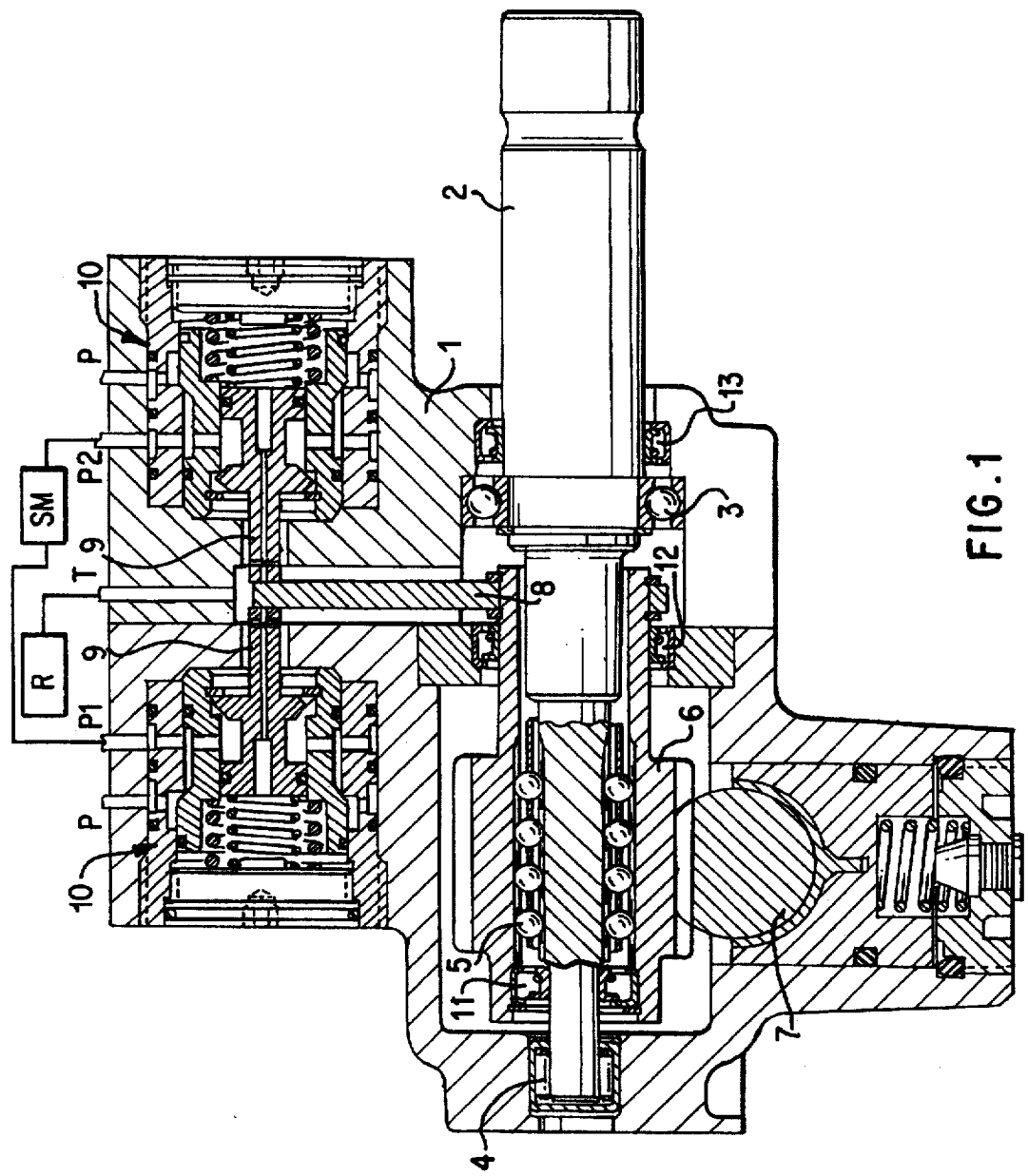
FIG. 1 is a sectional view of the rack-and-pinion steering system according to the present invention.

An input shaft 2 is rotatably mounted with radial and axial immovability in a gear casing 1. For this purpose, at that end of the input shaft 2 which is to be connected to the steering shaft (not shown) or to the steering wheel (likewise not shown), use is made of a grooved ball bearing 3 which is of large dimensions and correspondingly heavily loadable and is arranged such that, in particular, movement of the input shaft 2 to the right in the drawing is prevented. The other end of the input shaft 2, which has a smaller diameter, is rotatably mounted by means of a needle bearing 4 arranged such that movements of the input shaft 2 to the right in the drawing from the position illustrated are prevented.

A pinion 6 in the form of a sleeve is mounted on the input shaft 2 with a linear-ball bearing 5 in such a manner as to be rotationally fixed and axially movable thereon. The linear-ball bearing 5 is essentially formed by balls which are held in a sleeve-like cage and which run in axial grooves in the outer circumference of the input shaft and the inner circumference of the sleeve-like pinion 6.

The pinion 6, which has helical toothing, interacts with a correspondingly helical-toothed rack 7 which uses a steering linkage or the like to control the steered wheels of a vehicle in a known manner (not illustrated).

Because of the helical toothing the pinion 6 attempts to move in the axial direction of the input shaft 2 when forces are transmitted between the pinion 6 and the rack 7. The direction of this movement depends on the direction of the forces transmitted between the pinion 6 and the rack 7.

A transmission lever 8 is mounted rotatably and fixed axially on a sleeve-like extension formed on the pinion 6 and axially adjoining the toothing of the latter, so that said lever moves with only the axial movements of the pinion 6 but not with its rotation.

Inside the casing 1 the transmission lever 8 projects between two push rods 9 of two valve cartridges 10 of a servo valve arrangement for the control of a servomotor SM. Depending on the axial movement of the pinion 6 in one axial direction or the other, the transmission lever 8 actuates either the push rod 9 on the left or the push rod on the right in the drawing. The servomotor is thereby actuated in one direction or the other.

The valve cartridges 10, each have a pressure connection P connected to a hydraulic pressure source, a servomotor connection P1 and P2 respectively, and a connection leading via axial ducts in the push rods to a connection T leading to a tank or reservoir R which has zero pressure or only a low pressure.

The connection T is arranged on the casing 1 in such a manner that it is in communication with the casing interior receiving the transmission lever 8 and also with the portion bounded by seals 11 to 13 of the space provided in the casing 1 to receive the pinion 6 and the rack 7. As can be seen from the drawing, this portion of the space accommodates not only the grooved ball bearing 3 but also the linear-ball bearing 5, so that these elements are also lubricated by the hydraulic fluid of the hydraulic servo system. Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A servo-assisted rack-and-pinion steering system, comprising:

a rotatable shaft mounted radially fixed in a housing;

a pinion formed as a sleeve mounted concentrically around the shaft, said pinion being axially movable relative to the shaft and being rotatably fixed relative to the shaft, said pinion including a helical toothing on an outer peripheral surface;

a helical-toothed rack interacting with said helical toothing of the pinion to transmit a rotation of the pinion into a steering movement of the rack; and a transmission member mounted on said pinion, said transmission member being axially fixed relative to the pinion and being rotatable relative to the pinion, said transmission member being operatively connected to a servo control system of a servomotor which assists said steering movement of the rack, said transmission member actuating said servo control system in response to an axial movement of said pinion.

2. A rack-and-pinion steering system according to claim 1, wherein the rotatable shaft is axially fixed.

3. A rack-and-pinion steering system according to claim 2, wherein the pinion is mounted on the shaft with at least one linear-ball bearing.

4. A rack-and-pinion steering system according to claim 3, wherein said servo control system is a hydraulic servo system, and the at least one linear-ball bearing of the pinion on the shaft is arranged in a space in hydraulic communication with a hydraulic reservoir of the hydraulic servo system.

5. A rack-and-pinion steering system according to claim 2, wherein the pinion is mounted on the shaft with at least one bearing, said servo control system is a hydraulic servo system, and the bearing of the pinion on the shaft is arranged in a space in hydraulic communication with a hydraulic reservoir of the hydraulic servo system.

6. A rack-and-pinion steering system according to claim 1, wherein the pinion is mounted on the shaft with at least one linear-ball bearing.

7. A rack-and-pinion steering system according to claim 6, wherein said servo control system is a hydraulic servo system, and the at least one linear-ball bearing of the pinion on the shaft is arranged in a space in hydraulic communication with a hydraulic reservoir of the hydraulic servo system.

8. A rack-and-pinion steering system according to claim 6, wherein said at least one linear-ball bearing is arranged concentrically with said helical toothing of the pinion.

9. A rack-and-pinion steering system according to claim 1, wherein the pinion is mounted on the shaft with at least one bearing, said servo control system is a hydraulic servo system, and the bearing of the pinion on the shaft is arranged in a space in hydraulic communication with a hydraulic reservoir of the hydraulic servo system.

10. A servo-assisted rack-and-pinion steering system, comprising:

a rotatable shaft mounted radially fixed in a housing;

a pinion formed as a sleeve mounted concentrically around the shaft, said pinion being axially movable relative to the shaft and being rotatably fixed relative to the shaft, said pinion including a helical toothing on an outer peripheral surface; and a helical-toothed rack interacting with said helical toothing of the pinion to transmit a rotation of the pinion into a steering movement of the rack;

said pinion being operatively connected to a servo control system of a servomotor which assists said steering movement of the rack, an axial movement of said pinion actuating said servo control system.

11. A rack-and-pinion steering system according to claim 10, wherein the rotatable shaft is axially fixed.

12. A rack-and-pinion steering system according to claim 11, wherein the pinion is mounted on the shaft with at least one bearing, said servo control system is a hydraulic servo system, and the bearing of the pinion on the shaft is arranged in a space in hydraulic communication with a hydraulic reservoir of the hydraulic servo system.

13. A rack-and-pinion steering system according to claim 10, wherein the pinion is mounted on the shaft with at least one linear-ball bearing.

14. A rack-and-pinion steering system according to claim 13, wherein said servo control system is a hydraulic servo system, and the at least one linear-ball bearing of the pinion on the shaft is arranged in a space in hydraulic communication with a hydraulic reservoir of the hydraulic servo system.

15. A rack-and-pinion steering system according to claim 13, wherein said at least one linear-ball bearing is arranged concentrically with said helical toothing of the pinion.

16. A rack-and-pinion steering system according to claim 10, wherein the pinion is mounted on the shaft with at least one bearing, said servo control system is a hydraulic servo system, and the bearing of the pinion on the shaft is arranged in a space in hydraulic communication with a hydraulic reservoir of the hydraulic servo system.

* * * * *